(12) United States Patent
Nakazawa (10) Patent No.: US 11,500,676 B2
(45) Date of Patent: Nov. 15, 2022

(54) INFORMATION PROCESSING APPARATUS, METHOD, AND NON-TRANSITORY COMPUTER-READABLE STORAGE MEDIUM

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 16/926,152

(22) Filed: Jul. 10, 2020

(65) Prior Publication Data

US 2021/0019183 A1 Jan. 21, 2021

(30) Foreign Application Priority Data

Jul. 16, 2019 (JP) .............................. JP2019-131059

(51) Int. Cl.
*G06F 9/48* (2006.01)
(52) U.S. Cl.
CPC .......... *G06F 9/4881* (2013.01); *G06F 9/4831* (2013.01)
(58) Field of Classification Search
CPC ............................ G06F 9/4831; G06F 9/4881
See application file for complete search history.

(56) References Cited

U.S. PATENT DOCUMENTS

| | | | | |
|---|---|---|---|---|
| 7,478,130 B2 * | 1/2009 | Aoki | ...................... | H04L 67/16 |
| | | | | 709/206 |
| 9,910,711 B1 * | 3/2018 | Ryoo | .................... | G06F 9/5061 |
| 10,203,985 B2 * | 2/2019 | Nakazawa | ............ | G06F 9/4881 |
| 11,194,571 B2 * | 12/2021 | Nakazawa | .......... | G06F 12/0802 |
| 2013/0054576 A1 * | 2/2013 | Karmarkar | .............. | G06F 16/95 |
| | | | | 707/E17.014 |
| 2016/0335132 A1 * | 11/2016 | Ash | ........................ | G06F 9/505 |
| 2019/0005055 A1 * | 1/2019 | Andrew | .............. | G06F 16/9535 |
| 2019/0005087 A1 * | 1/2019 | Pattanaik | ............. | G06F 16/2365 |
| 2020/0036244 A1 * | 1/2020 | Aida | ...................... | H02K 1/276 |

FOREIGN PATENT DOCUMENTS

JP 2016-115333 A 6/2016

* cited by examiner

*Primary Examiner* — Henry Tsai
*Assistant Examiner* — Christopher A Daley
(74) *Attorney, Agent, or Firm* — Canon U.S.A., Inc. IP Division (57) ABSTRACT

An agent application manages a response time relating to a communication between a manager and the agent application. The agent application executes processing according to a request from the manager by using a plurality of threads, a number of the plurality of threads being a threshold value or less, transmits, to the manager, data indicating a result of the processing executed by the agent application, and performs an adjustment to decrease the threshold value based on a change in response time in a plurality of response times corresponding to a plurality of instances of communications performed between the agent application and the manager.

10 Claims, 10 Drawing Sheets

INFORMATION PROCESSING APPARATUS, METHOD, AND NON-TRANSITORY COMPUTER-READABLE STORAGE MEDIUM

BACKGROUND

Field

The present disclosure relates to a technique for adjusting a load on a manager in a manager/agent system.

Description of the Related Art

For managing a plurality of devices, a system has been developed, referred to as a manager/agent system, which includes a management apparatus as a manager and a relay apparatus as an agent that cooperates with the manager.

For example, Japanese Patent Application Laid-Open No. 2016-115333 discusses an example of a manager/agent system in which a plurality of agents is installed. A relay apparatus acting as an agent has a function of searching for a network device on a network on which the relay apparatus belongs. In a case where a network device is found, the relay apparatus generates a request for notifying a management system of information about the network device, and transmits the request to the management system. The relay apparatus also has a function of generating a request for notifying the management system of operation information collected from the network device, and transmitting the request to the management system.

In the manager/agent system, the manager instructs the agent on a processing content, and the agent performs processing according to the manager's instruction and notifies the manager of a processing result.

In a case where there are a large number of requests and notifications from the agent, due to, for example, the number of the devices that are management targets of the manager, a processing load on the manager increases. Consequently the processing load may come to exceed an original processing capacity of the manager. Japanese Patent Application Laid-Open No. 2016-115333 discusses a function for monitoring a request amount and a processing load on the management system and automatically performing an adjustment (auto scaling) to increase a resource amount (such as the number of virtual machines) to process the requests, if needed.

In some cases, however, the manager/agent system is established in an environment in which available resources are limited. In such an environment, an adjustment such as adding a personal computer (PC) resource (and thereby adding to the number of virtual machines) for the manager cannot be performed as discussed in Japanese Patent Application Laid-Open No. 2016-115333. In a case where the manager enters a high load state which exceeds the manager's processing capacity, without an increase in the resources available to the manager, performance of the manager may significantly deteriorate and recovery from the deteriorated state can become difficult in some cases.

SUMMARY

According to various embodiments of the present disclosure, an information processing apparatus includes at least one memory storing instructions related to an agent application that executes processing according to a request from a manager, and at least one processor executing the instructions to cause the information processing apparatus to manage a response time relating to a communication including a transmission of data by the agent application and a response from the manager, execute the processing according to the request from the manager, by using a plurality of threads, a number of the plurality of threads being a first threshold value or less, transmit, to the manager, data indicating a result of the executed processing, and perform an adjustment to decrease the first threshold value based on a change in response time in a plurality of response times corresponding to a plurality instances of communications performed between the agent application and the manager.

Further features will become apparent from the following description of exemplary embodiments with reference to the attached drawings.

DESCRIPTION OF THE EMBODIMENTS

Various example embodiments of the present disclosure will be described in detail below with reference to the attached drawings.

Figure 1:
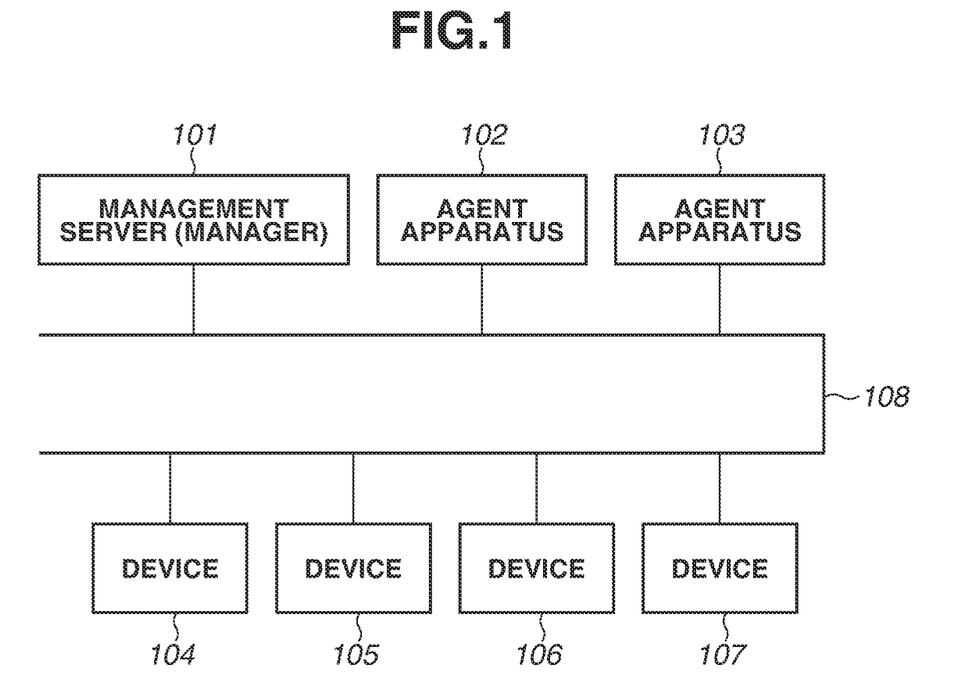
FIG. 1 is a configuration diagram of an entire network system according to one embodiment.

FIG. 1 illustrates an example of an entire configuration of a network system which includes a manager/agent system according to a first embodiment.

The network system includes a single management server (hereinbelow, referred to as "a manager") 101 and a plurality of agent apparatuses (hereinbelow, referred to as "agents") 102 and 103 and manages network devices (hereinbelow, referred to as "devices") 104 to 107. The manager 101, the agents 102 and 103, and the devices 104 to 107 are connected to each other via a network 108.

The manager 101 is an apparatus which is realized by installing a device management application on an information processing apparatus. The agent is an apparatus which is realized by installing a device agent application on the information processing apparatus.

In the present exemplary embodiment, for example, the agent 102 sets the devices 104 and 105 as monitoring targets, and the agent 103 sets the devices 106 and 107 as monitoring targets. A specific exemplary embodiment is described below using the agent 102 as a representative agent and the device 104 as a representative device.

The manager 101 issues an instruction for an operation to be performed on the device 104 to the agent 102. The agent 102 performs the operation, such as transmitting a request to the device 104, according to the instruction and transmits a result to the manager 101. An example of the operation includes obtaining device information and operation information from the device 104. Other examples of the instruction include changing of a setting value of the device 104 and installation of an application to the device 104. While, in FIG. 1, two agents and four devices are disposed as the management targets, the configuration and operation are similar to the description according to the present exemplary embodiment even in a case of a network system in which tens of thousands of devices are managed via a dozen of agents.

Figure 2:
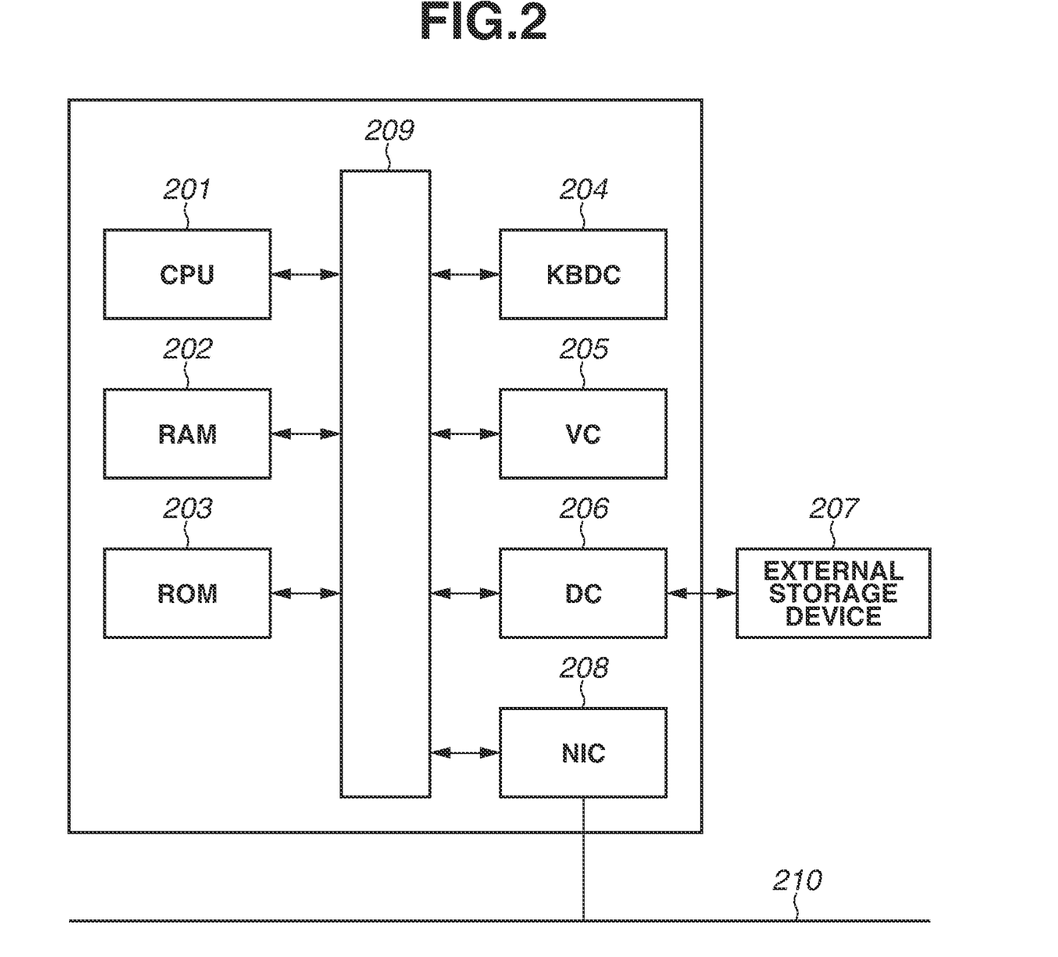
FIG. 2 is a block diagram illustrating an example of a hardware configuration of an information processing apparatus according to one embodiment.

FIG. 2 is a block diagram illustrating an example of a hardware configuration of the information processing apparatus in which the manager 101 and the agents 102 and 103 operate according to one embodiment.

As illustrated in FIG. 2, the information processing apparatus includes a central processing unit (CPU) 201, a random access memory (RAM) 202, a read-only memory (ROM) 203, and an external storage device 207. The CPU 201 comprehensively controls each device connected to a system bus 209 by loading software (a program) stored in the ROM 203 and the external storage device 207 or downloaded from a network 210 into the RAM 202 and executing the software (program) as necessary.

The RAM 202 functions as a main memory or a work area of the CPU 201. The external storage device 207 includes a hard disk (HD) and a solid state drive (SSD). The external storage device 207 stores therein various applications, database data, and a user file. Various applications include a boot program, an operating system (OS), an authentication server, and an authentication client. As described above, the CPU 201 of the information processing apparatus as the manager 101 executes a device management application program to realize various embodiments of the present disclosure. Further, the CPU 201 of the information processing apparatus as the agents 102 and 103 executes an agent application program to realize various embodiments of the present disclosure.

A keyboard controller (KBDC) 204 transmits information input from an input device, such as a keyboard and a pointing device, which are not illustrated, to the CPU 201. A video controller (VC) 205 controls display on a display device including a liquid crystal display (LCD). A disk controller (DC) 206 controls access to and from the external storage device 207. A network interface controller (NIC) 208 is a communication controller, and the information processing apparatus connects to the network 210 via the NIC 208.

Figure 3:
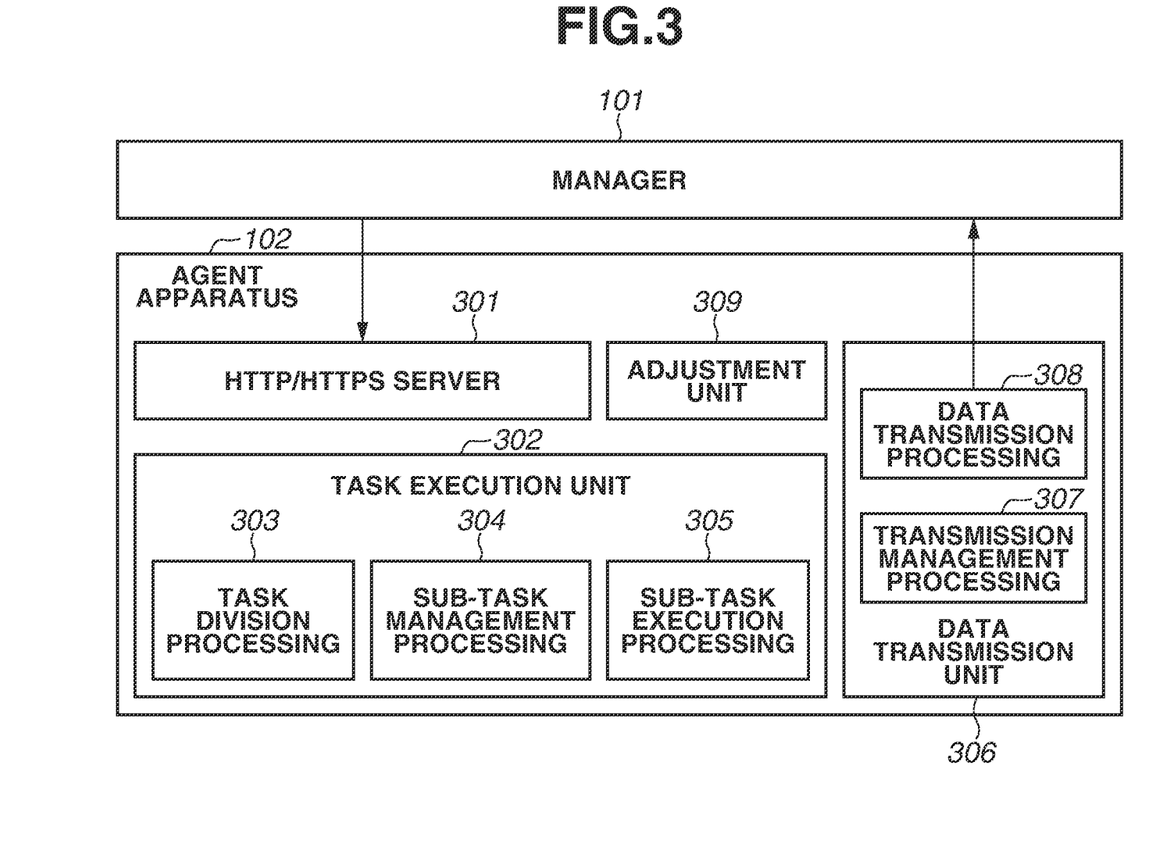
FIG. 3 is a conceptual diagram illustrating processing executed in a manager and an agent according to one embodiment.

FIG. 3 is a conceptual diagram illustrating processing executed in the manager 101 and the agent 102 according to one embodiment. The conceptual diagram is a block diagram illustrating a configuration of a software module and a processing unit thereof.

A Hypertext Transfer Protocol/Hypertext Transfer Protocol Secure (HTTP/HTTPS) server 301 receives a request including an instruction from the manager 101 by HTTP or HTTPS and calls various functions in the agent 102. Further, the HTTP/HTTPS server 301 responds to the manager 101 about reception of the request.

A task execution unit 302 executes processing (a task) specified to one or more devices as a target(s) of an instruction according to the instruction from the manager 101. In a case where the task is executed, the task execution unit 302 executes task division processing 303 for dividing the task into units for processing (hereinbelow, referred to as "sub-tasks") of the devices 104 and 105 as the targets. The task division processing 303 is performed to cause a plurality of devices to perform a processing content specified in the task in parallel.

Then, the task execution unit 302 executes sub-task management processing 304 for managing a plurality of sub-tasks, generated by dividing the task, in a queue and sub-task execution processing 305 for extracting the sub-task in the queue managed by the sub-task management processing 304 and executing the sub-task. The sub-task managed in the queue by the sub-task management processing 304 is independent from a type of the task. For example, a sub-task based on a task for obtaining information from the device and a sub-task based on a task for setting a value specified by the device are managed without distinction of types.

The task execution unit 302 dynamically generates an instance of a class by which the sub-task can be processed, according to a content of the sub-task extracted from the queue in the sub-task execution processing 305. The task execution unit 302 transfers processing of the sub-task to the generated instance and thus the sub-task can be processed without depending on the content of the sub-task. In addition, using a plurality of threads in the sub-task execution processing 305, the task execution unit 302 can extract a plurality of sub-tasks from the queue and execute the extracted sub-tasks in parallel (or almost at the same time).

A data transmission unit 306 transmits data from the agent 102 to the manager 101. The data is, for example, an execution result of the sub-task executed in the sub-task execution processing 305. The data transmission unit 306 executes transmission management processing 307 for managing data, which is to be transmitted, in a queue and data transmission processing 308 for transmitting the data to the manager 101. A queue that is used in the transmission management processing 307 is different from the queue used in the sub-task management processing 304.

The data transmission processing 308 extracts data from the queue and transmits the extracted data to the manager 101. In the data transmission processing 308, extraction of data and transmission to the manager 101 can be performed in parallel in a plurality of threads.

An adjustment unit 309 manages statistic information about a duration of response from the manager 101 when the data is transmitted to the manager 101 in the data transmission processing 308. Using the statistic information, the adjustment unit 309 can also control automatic adjustment of the number of threads in the sub-task execution processing 305 and the number of threads in the data transmission processing 308.

Figure 4:
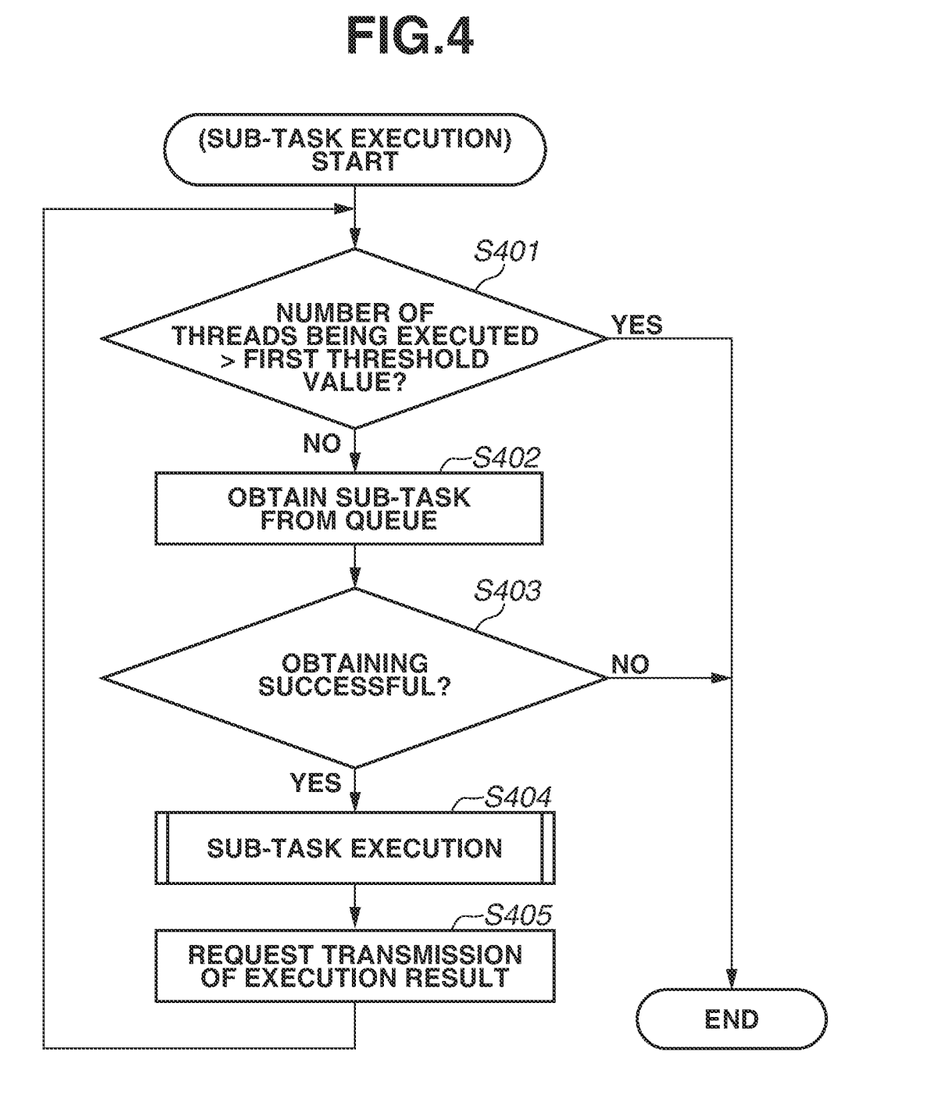
FIG. 4 is a flowchart illustrating sub-task execution processing according to one embodiment.

FIG. 4 is a flowchart illustrating details of the sub-task execution processing 305 described with reference to FIG. 3 according to one embodiment. The task execution unit 302 generates a plurality of threads in the sub-task execution processing 305, and each of the plurality of generated threads executes processing illustrated in FIG. 4 in parallel.

In step S401, the number of sub-task execution threads being currently executed is compared with a maximum number of threads (a first threshold value). The number of threads being executed includes the thread executing the processing according to the present exemplary embodiment. In a case where the number of threads being executed exceeds the first threshold value (YES in step S401), the thread executing the processing according to the present exemplary embodiment interrupts and terminates the processing illustrated in FIG. 4. According to the termination, the thread of which processing has been interrupted is discarded. The first threshold value is then adjusted by the adjustment unit 309, and therefore an adjustment of the number of threads to be started for processing the sub-task in the agent 102 according to the determination in step S401 can be performed. In a case where a started thread is discarded before the thread actually processes a sub-task, at least communication to the manager 101 (transmission of a processing result, etc.) by the thread is prevented.

Meanwhile, in step S401, in a case where the number of threads being executed is the first threshold value or less (NO in step S401), the processing proceeds to step S402. In step S402, the sub-task execution thread obtains one of the sub-tasks being managed in the queue. In step S403, determination of whether the sub-task can be obtained is performed. In a case where obtaining of the sub-task fails, in other words, in a case where a sub-task is not in the queue that is used in the sub-task management processing 304 (NO in step S403), the sub-task execution thread terminates the processing. Also in this case, the thread executing the present processing is discarded.

In step S403, in a case where obtaining of the sub-task is successful (YES in step S403), the processing proceeds to step S404. In step S404, the sub-task execution thread executes the extracted sub-task. In this step, an instance of a class which can process the sub-task is dynamically generated, and the processing content in the sub-task is executed as described above in FIG. 3. Subsequently, the sub-task execution thread receives an execution result of the sub-task.

In step S405, the sub-task execution thread requests the data transmission unit 306 in FIG. 3 to transmit the execution result of the sub-task to the manager 101, and the processing returns to step S401.

Subsequently, the sub-task execution thread repeats the above-described processing as long as the number of threads does not exceed the first threshold value and the sub-task is in the queue.

In a case where a sub-task is added to the queue in the sub-task management processing 304, and in a case where the above-described first threshold value is increased by processing by the adjustment unit 309, the task execution unit 302 additionally starts the sub-task execution thread.

Figure 5A:
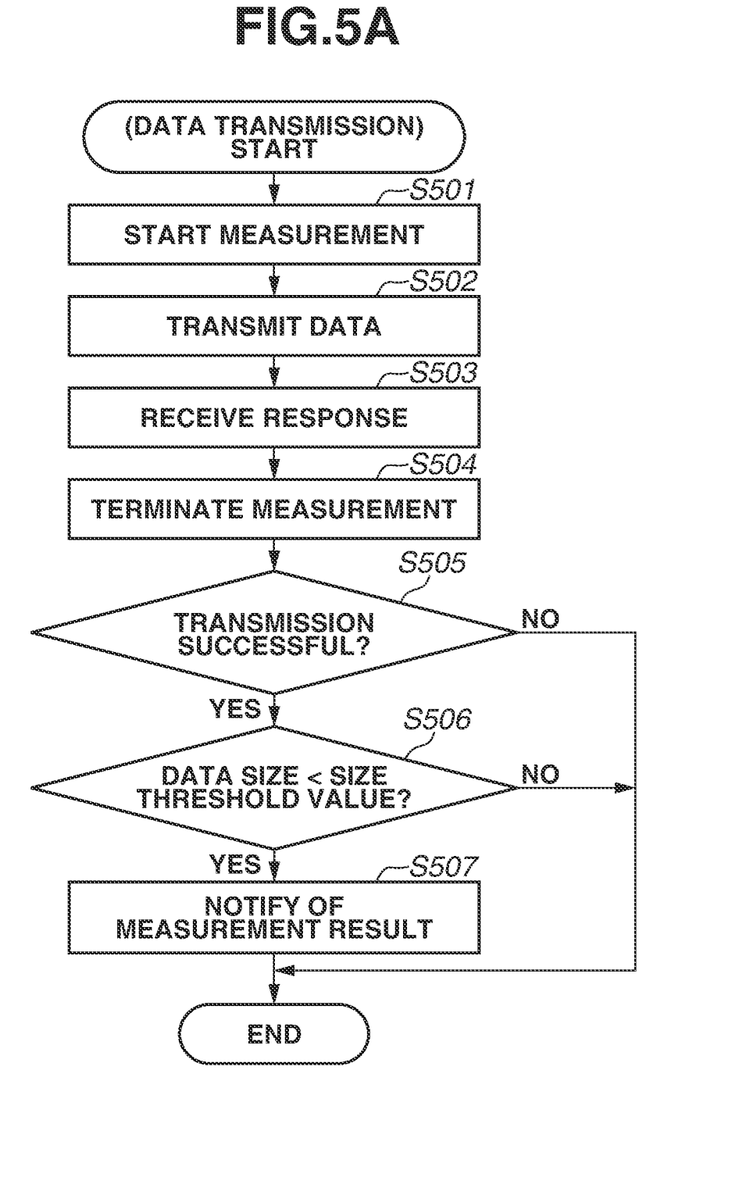
FIG. 5A is a flowchart illustrating processing which is executed in data transmission from the agent to the manager according to one embodiment.

FIG. 5A is a flowchart illustrating processing (the data transmission processing 308) that is executed in a case where the data transmission unit 306 transmits data to the manager 101 according to one embodiment. An entity which performs processing in the following steps is the data transmission unit 306. The processing according to the present exemplary embodiment for the data transmission is called together with data to be transmitted (and related information, such as a Uniform Resource Locator (URL) path and a data type).

In step S501, processing is started for measuring a duration time from a start of the processing according to the present exemplary embodiment, namely a start of data transmission to reception of a response from the manager 101 (hereinbelow, referred to as "a response time").

In step S502, the data transmission unit 306 transmits the data to be transmitted to the manager 101, and processing proceeds to step S503. In step S503, the data transmission unit 306 receives a response from the manager 101. In step S504, the data transmission unit 306 terminates measurement of the response time and stores the response time of the data transmission.

In step S505, the data transmission unit 306 checks a content of the response from the manager 101. In a case where no response is received or the response indicates failure of data reception (NO in step S505), the transmission processing according to the present exemplary embodiment is terminated. Meanwhile, in a case where the response indicates that the data reception by the manager 101 is successful (YES in step S505), the processing proceeds to step S506.

In step S506, the data transmission unit 306 compares a size of the data transmitted in step S502 with a size threshold value. In a case where the size of the data exceeds the size threshold value (NO in step S506), the present transmission processing is terminated. The size threshold value is a small value of, for example, 10 kilobytes. By the above-described processing, a measurement result having a higher proportion of a data transfer duration in the response time is excluded.

In step S507, the data transmission unit 306 notifies the adjustment unit 309 of the response time as the measurement result and terminates the present transmission processing.

Figure 5B:
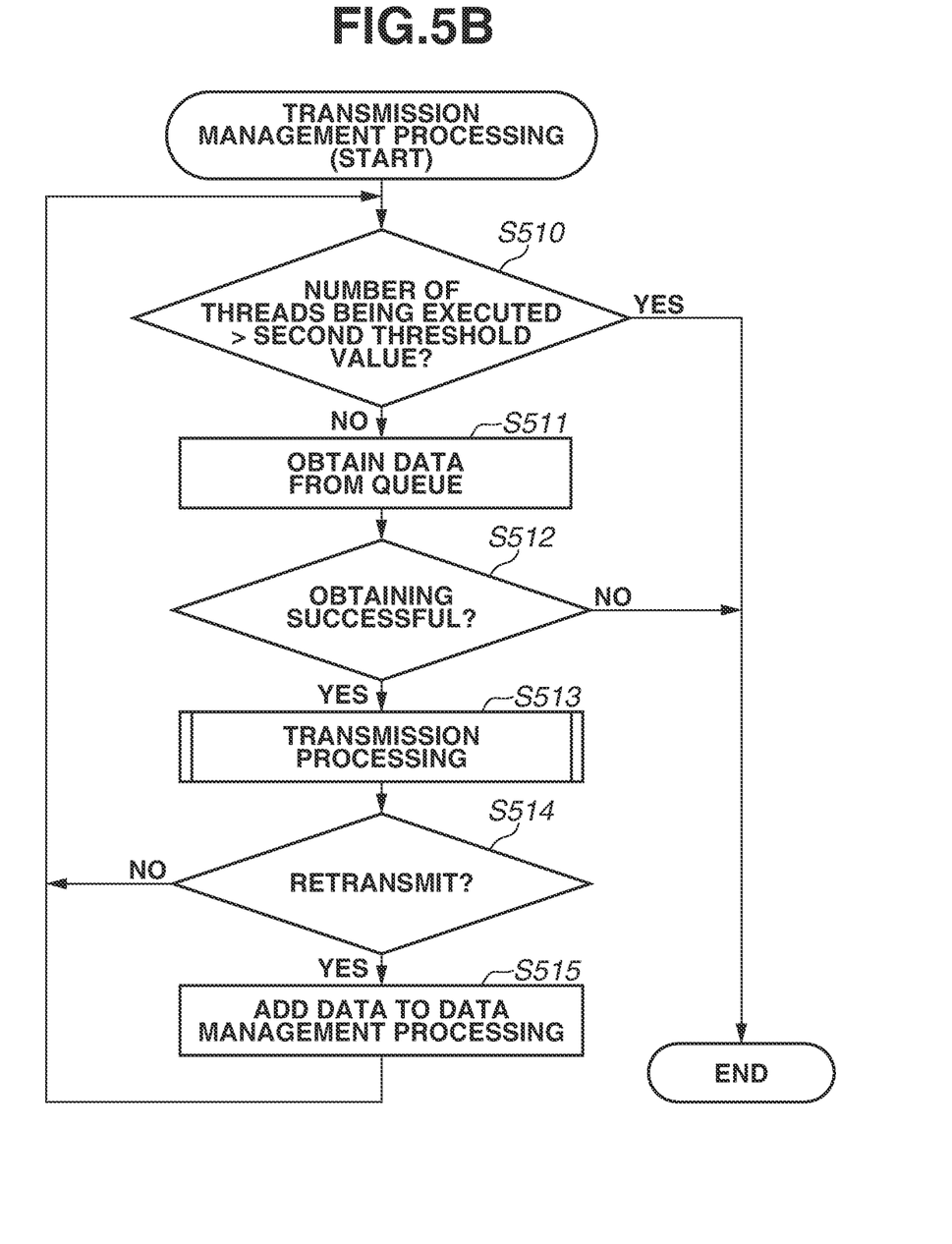
FIG. 5B is a flowchart illustrating management processing executed in the data transmission according to one embodiment.

FIG. 5B is a flowchart illustrating the transmission management processing 307 by the data transmission unit 306 according to one embodiment. The data transmission processing 308 described with reference to FIG. 5A is executed in parallel using a plurality of threads. The present management processing is processing for managing the number of threads to be started for data transmission, and the following processing is executed by each thread (a data transmission thread) started for the data transmission.

In step S510, the data transmission unit 306 compares the number of data transmission threads being currently executed with a maximum number (a second threshold value) of threads available for the data transmission. The number of data transmission threads being executed includes the thread started for the processing according to the present exemplary embodiment. In a case where the number of data transmission threads being executed exceeds the second threshold value (YES in step S510), the thread started for the processing according to the present exemplary embodiment terminates the present management processing. The thread is discarded according to termination of the processing. By the above-described processing, communication (transmission of a processing result, etc.) to the manager 101 which is to be executed by the discarded thread is prevented.

The first threshold value for adjusting the number of threads for the sub-task execution and the second threshold value for adjusting the number of threads for the data transmission in the present processing are separately managed.

In step S510, in a case where it is determined that the number of data transmission threads being executed is the second threshold value or less (NO in step S510), the processing proceeds to step S511. In step S511, the data transmission unit 306 obtains data from the queue which is used in the transmission management processing 307. The data in the queue is, for example, data indicating the execution result requested in step S405. In step S512, the data transmission unit 306 determines whether the data obtaining from the queue is successful. In a case where the data obtaining fails, in other words, in a case where data is not in the queue (NO in step S512), the data transmission thread terminates the processing. In this case, the data transmission thread is discarded. In a case where the data obtaining from the queue is successful (YES in step S512), the processing proceeds to step S513.

In step S513, the data transmission unit 306 calls the transmission processing in FIG. 5A using the data obtained in step S511. Accordingly, the data obtained in step S511 is transmitted to the manager 101. The data transmission thread receives a transmission result of the data transmission.

In step S514, the data transmission unit 306 determines necessity for retransmission of the data from the transmission result. For example, retransmission is required in a case where there is no response from the manager 101 and is not required in a case where the data transmission is successful or the manager 101 refuses data reception. In a case where it is determined that the retransmission is not required (NO in step S514), the processing returns to step S510 and continues. Meanwhile, in a case where it is determined that the retransmission is required (YES in step S514), the processing proceeds to step S515. In step S515, the data transmission thread adds the data obtained in step S511 again in the queue which is used in the transmission management processing 307, and the processing proceeds to step S510.

The data transmission thread repeats the above-described processing as long as the number of threads does not exceed the second threshold value, and data is in the queue. In a case where data is added to the queue, and in a case where the adjustment unit 309 increases the second threshold value of the number of threads for the data transmission, the data transmission unit 306 additionally starts the data transmission thread.

Figure 6:
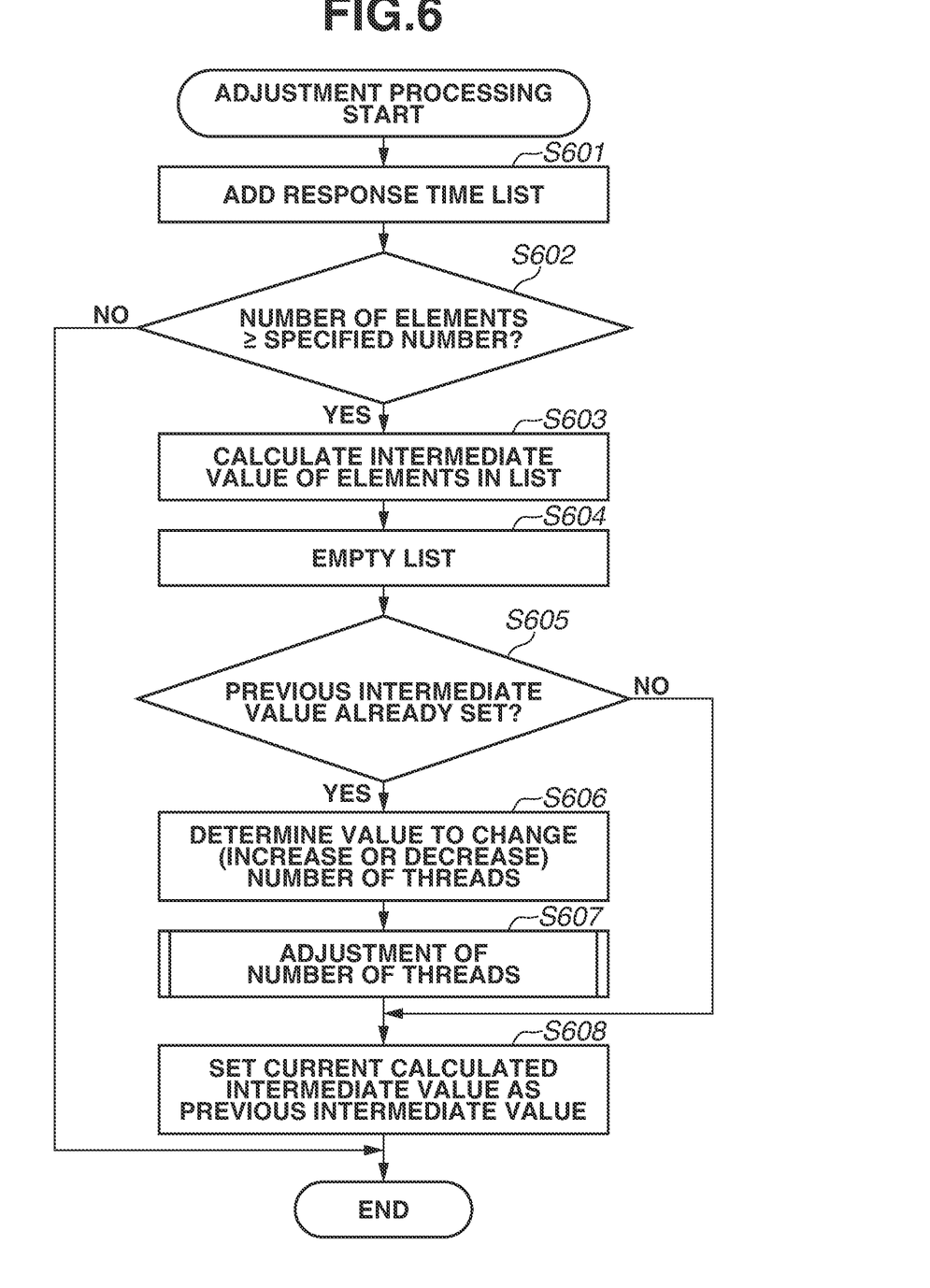
FIG. 6 is a flowchart illustrating adjustment processing which is executed in the agent according to one embodiment.

FIG. 6 is a flowchart illustrating adjustment processing executed by the adjustment unit 309 in FIG. 3 according to one embodiment. The adjustment processing is called according to the notification in step S507 in FIG. 5A. The response time of the data transmission to the manager 101 included in the notification is used for the adjustment processing. The adjustment unit 309 manages the response time in a list every time the response time is notified from the data transmission unit 306. The adjustment unit 309 can check how the response time changes by referring to the list.

In step S601, the adjustment unit 309 records the notified response time as an element in the list.

In step S602, the adjustment unit 309 determines whether the number of elements in the list is a specified number or more. In a case where the number of elements in the list is less than the specified number (NO in step S602), the present adjustment processing is terminated. In a case where the number of elements in the list is the specified number or more (YES in step S602), the processing proceeds to step S603. In step S603, the adjustment unit 309 calculates an intermediate value from response times indicated by a plurality of elements in the list and, in step S604, empties the list.

As the specified number, a fixed value such as 50 and 100 can be set in advance. More specifically, the processing in step S603 is executed, for example, every time the notification is received from the data transmission unit 306 for 50 times, and an intermediate value is calculated from response times included in the 50 notifications. A reason why an intermediate value is used instead of an average value in the present exemplary embodiment is that a distribution of response times is not a normal distribution.

In step S605, the adjustment unit 309 determines whether the intermediate value of the previous processing is already set by executing the adjustment processing by that time. In a case where the intermediate value is already set (YES in step S605), the processing proceeds to step S606. Meanwhile, in a case where the intermediate value is not set (NO in step S605), the processing proceeds to step S608.

In step S606, the adjustment unit 309 determines a value for changing the number of threads. The value determined in this step is information capable of identifying whether to increase or decrease the threads. For example, in a case where the intermediate value calculated in step S603 is large compared with the previous intermediate value, in other words, in a case where the response from the manager 101 becomes slower, the value is determined to decrease the number of threads in the agent. Meanwhile, in a case where the intermediate value calculated in step S603 is small compared with the previous intermediate value, the value is determined to increase the number of threads. In step S607, the adjustment unit 309 calls the adjustment processing of the number of threads (FIG. 7) by passing the value determined in step S606.

In step S608, the adjustment unit 309 sets the intermediate value calculated in step S603 as the previous intermediate value and then terminates the present adjustment processing.

Figure 7:
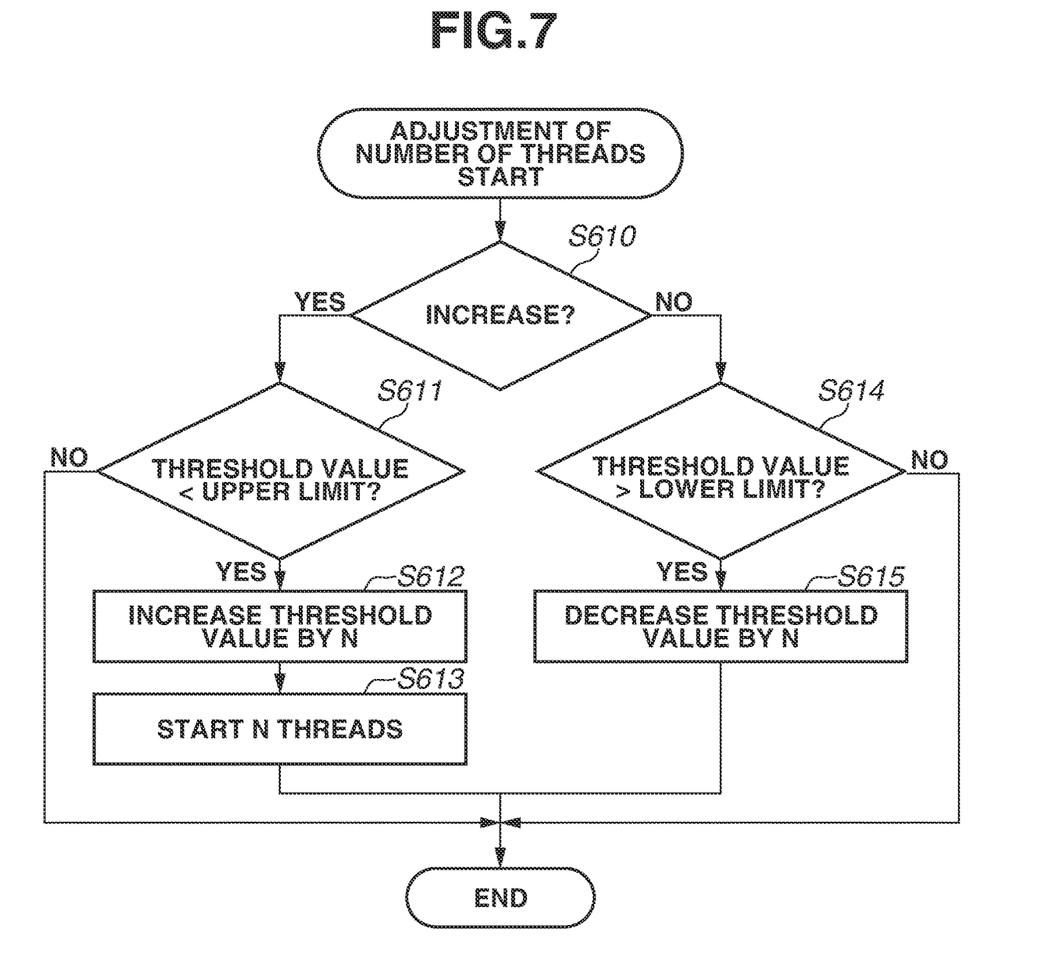
FIG. 7 is a flowchart illustrating processing for adjusting the number of threads executed in adjustment processing according to one embodiment.

FIG. 7 is a flowchart illustrating the adjustment processing of the number of threads which is called by the processing in step S607 in FIG. 6 and executed by the adjustment unit 309 according to one embodiment.

The threads to be adjustment targets are the sub-task execution thread, which is used in the sub-task execution processing 305, and the data transmission thread, which is used in the data transmission processing 308. Processing described below is executed for each of the sub-task execution thread and the data transmission thread in response to one call by the above-described processing in step S607.

In step S610, the adjustment unit 309 determines whether to increase or decrease the number of threads. In a case where the number of threads is increased (YES in step S610), the processing proceeds to step S611. Meanwhile, in a case where the number of threads is decreased (NO in step S610), the processing proceeds to step S614.

In step S611, the adjustment unit 309 determines whether the threshold value of the number of the current threads is less than an upper limit of the number of threads. In a case where the threshold value is more than or equal to the upper limit (NO in step S611), the number of threads cannot be increased, and therefore the present adjustment processing is terminated. In a case where the threshold value is less than the upper limit (YES in step S611), the processing proceeds to step S612.

As the threshold value of the thread, in a case where the number of the sub-task execution threads is adjusted, the first threshold value used in step S401 is a determination target. Meanwhile, in a case where the number of the data transmission threads is adjusted, the second threshold value used in step S510 is the determination target. The upper limit of the number of threads is an upper limit number set in advance in each of the sub-task execution processing 305 and the data transmission processing 308 by factoring, for example, allocation of resources of the information processing apparatus in which the manager 101 operates.

In step S612, the adjustment unit 309 increases the threshold value by "N" which is a predetermined value. The value of N is set in advance in each of the sub-task execution processing 305 and the data transmission processing 308. The threshold value is increased up to the upper limit number used in step S611.

In step S613, the adjustment unit 309 respectively instructs the task execution unit 302 and the data transmission unit 306 to additionally start the sub-task execution thread and the data transmission thread. In this step, a thread(s) of the number corresponding to the threshold value increased by the processing in step S612 is started. In a case where the thread is started, the sub-task execution processing 305 or the data transmission processing 308 described above is started.

During a period in which the response time between the manager and the agent is improved by the processing in steps S612 and S613, additional start of the thread on the agent is gradually allowed by the value of N, so that efficiency in the agent by parallel processing is improved.

In step S614, the adjustment unit 309 determines whether the threshold value of the number of the current threads is more than lower limit of the number of threads. In a case where the threshold value is less than or equal to the lower limit (NO in step S614), the number of threads cannot be decreased, and therefore the present adjustment processing is terminated. In a case where the threshold value is more than the lower limit (YES in step S614), the processing proceeds to step S615.

In this step, as the threshold value of the thread, the first threshold value and the second threshold value are the determination targets, similar to step S611. The lower limit of the number of threads is a lower limit number set in advance in each of the sub-task execution processing 305 and the data transmission processing 308 by factoring, for example, allocation of the resources of the information processing apparatus in which the manager 101 operates.

In step S615, the adjustment unit 309 decreases the threshold value by "N" which is the predetermined value. The threshold value is decreased to the lower limit number used in step S614 at a minimum.

During a period in which the response time between the manager and the agent is deteriorated by the processing in step S615, the thread on the agent is gradually decreased by the value of N, so that the data transmission from the agent to the manager is reduced, and therefore a processing load on the manager is reduced or suppressed.

While a constant is used as the value of N, the value of N can be dynamically changed based on, for example, the number of pieces of data in the queue and a change (increase or decrease) of the number of pieces of data in the queue in the transmission management processing 307. For example, an adjustment to be described below is possible.

The number of pieces of data in the queue is recorded each time the processing illustrated in FIG. 7 is executed, and in a case where the recorded number increases from the previous measurement, the value of N is changed to decrease the number of threads being executed. Meanwhile, in a case where the number of pieces of data in the queue decreases, the value of N is changed to increase the number of threads. Alternatively, in a case where the number of pieces of data in the queue exceeds a predetermined number, the value of N can be changed to decrease the number of threads being executed.

Figure 8:
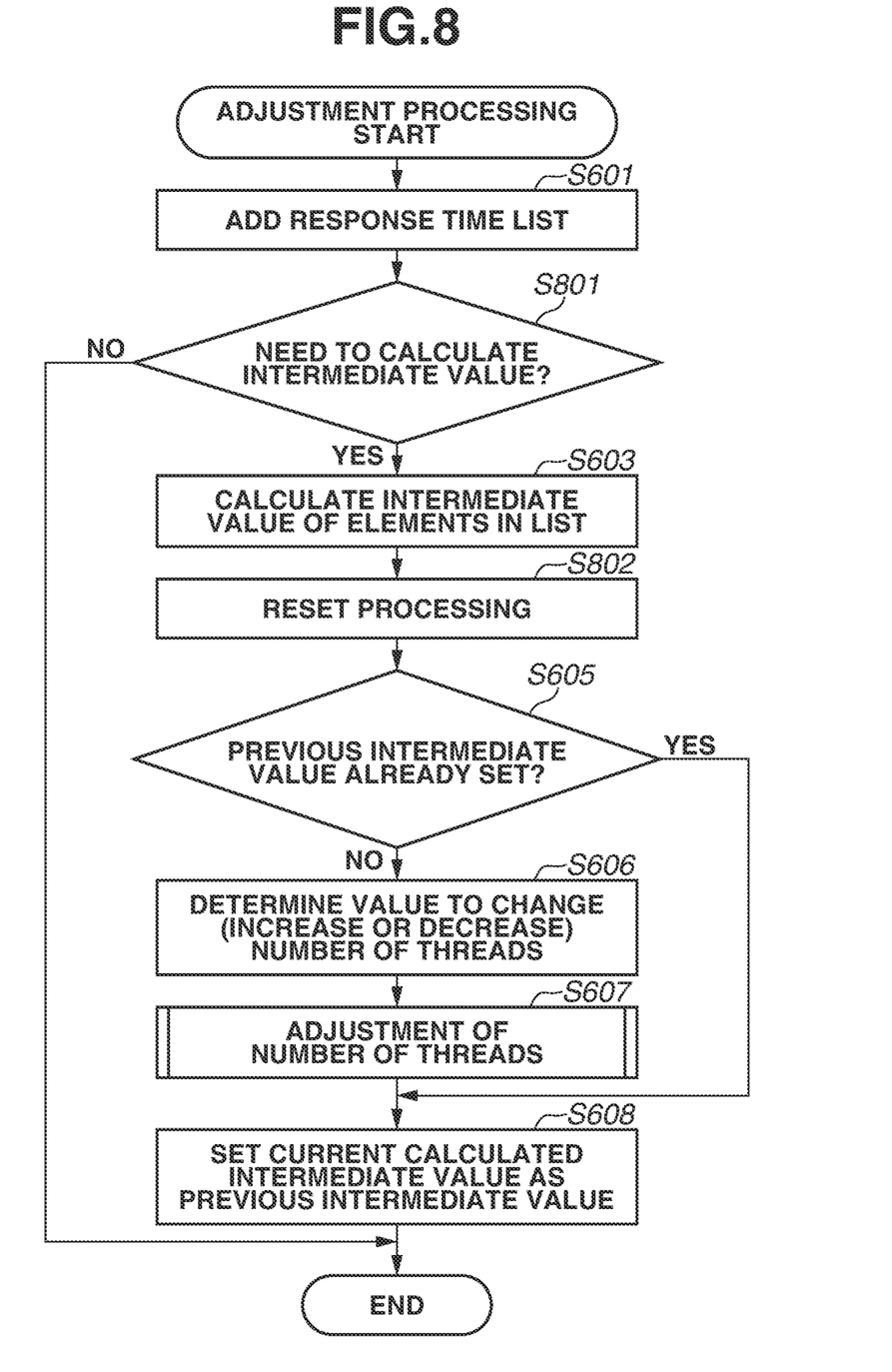
FIG. 8 is a flowchart illustrating a modification of the processing in FIG. 6 according to one embodiment.

FIG. 8 is a flowchart illustrating a modification of the adjustment processing by the adjustment unit 309 illustrated in FIG. 6 according to one embodiment. Processing different from that in FIG. 6 is additionally described below.

In step S801, the adjustment unit 309 determines whether calculation of the intermediate value is needed. The adjustment unit 309 determines that the intermediate value needs to be calculated in a case where at least any one of the following conditions is satisfied.

The number of elements in the list is more than the above-described specified number (a first specified number $\alpha$) similar to step S602.

A predetermined time has passed since the processing in step S802 is executed last time, and the number of elements in the list is more than a second specified number $\beta$ ($\alpha > \beta$).

The second condition means that communication is executed a certain number of times between the manager and the agent within the predetermined time. The lapse of time in step S801 can be calculated by taking a difference between a start time of the previous processing in step S802 and a current time.

In step S802, the adjustment unit 309 performs reset processing. Specifically, the following processing is executed.

The list is emptied (similar to step S604).

The above-described start time is set to the current time.

The adjustment unit 309 sets the start time to the current time even in a case where the list does not exist yet and is newly generated because adjustment processing is started for the first time at the procedure of step S601.

Priority of processing may differ depending on a content of a task. Therefore, according to a second example embodiment, the task execution unit 302 according to the first example embodiment is improved. According to the second example embodiment, changes from the first example embodiment associated with the improvement are described.

Figure 9:
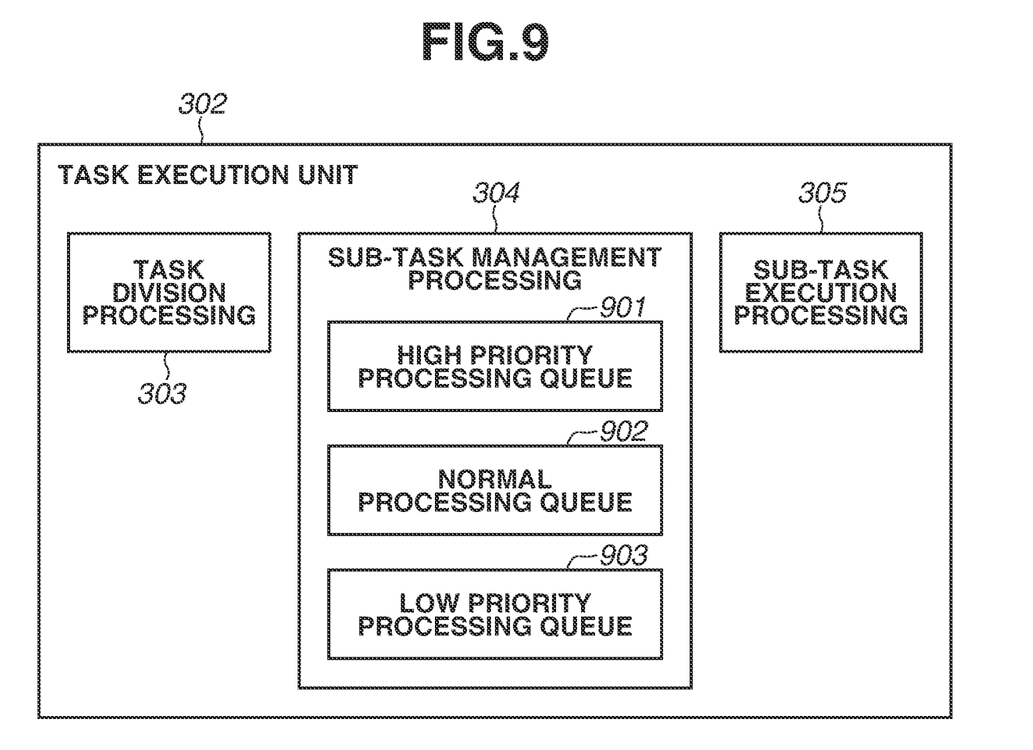
FIG. 9 is a diagram illustrating details of a task execution unit in an agent according to one embodiment.

FIG. 9 illustrates details of the task execution unit 302 according to the second example embodiment.

In the sub-task management processing 304, three queues, namely a high priority processing queue 901, a normal processing queue 902, and a low priority processing queue 903 are selectively used.

In the task division processing 303, a task is divided into sub-tasks, and the queue is selected from these three queues, according to a content of the sub-task. In the sub-task management processing 304, the sub-task is added to the selected queue and managed.

For example, in the task division processing 303, the high priority processing queue 901 is selected for a sub-task based on a task (status monitoring) for notifying a device user of an error in the device 104 as the management target. The low priority processing queue 903 is selected for a sub-task based on a task with low urgency such as backup of a setting value of the device 104 as the management target. Even in a case of the status monitoring task, the high priority processing queue 901 can be selected for a sub-task corresponding to a device which responds to a packet transmitted to each device as the management target, and the low priority processing queue 903 can be selected for a sub-task corresponding to a device which does not immediately respond to the packet. The task further includes a setting information delivery task, an address book delivery task, and a software delivery task such as firmware and an application. The setting information delivery task and the address book delivery task are regarded as tasks with low urgency. In a case where a requirement such as security is included, the high priority processing queue 901 is selected for a sub-task corresponding to the software delivery task.

The task execution unit 302 divides the sub-task execution thread available for the sub-task execution processing 305 into a thread group for high priority processing, a thread group for normal processing, and a thread group for low priority processing. The thread group for high priority processing, the thread group for normal processing, and the thread group for low priority processing respectively obtain sub-tasks from the high priority processing queue 901, the normal processing queue 902, and the low priority processing queue 903 and execute the sub-tasks.

A threshold value distributed based on the first threshold value indicating the upper limit of the number of threads available for the sub-task execution processing 305 described with reference to FIG. 4 according to the first example embodiment is allocated to each of the thread groups.

According to the present example embodiment, the threshold value allocated to each of the thread groups is determined as below. If the first threshold value is M, each threshold value is as follows.

A threshold value (Mh) of the number of threads for high priority processing: M/7
A threshold value (Ml) of the number of threads for low priority processing: M/3
A threshold value (Mn) of the number of threads for normal processing: M−(Mh+Ml)

According to the second example embodiment, the thread group for high priority processing, the thread group for low priority processing, and the thread group for normal processing execute the sub-tasks obtained from target queues by the processing illustrated in FIG. 4. In the processing, in step S401, the respective thread groups use the corresponding threshold values Mh, Ml, and Mn.

According to the second exemplary embodiment, the sub-task execution thread in the thread group for high priority processing calls the transmission processing in FIG. 5A in step S405. Further, the sub-task execution thread in the other thread groups requests the data transmission unit 306 to add data for transmitting the execution result to the queue to be used in the transmission management processing 307. In other words, the execution result of the sub-task by the thread other than the thread group for high priority processing is transmitted with delay to the manager asynchronously with execution of the sub-task in the processing in the data transmission thread according to FIG. 5B.

In step S402, the sub-task execution thread included in the thread group for low priority processing may obtain the sub-task from the normal processing queue 902 in a case where obtaining the sub-task from the low priority processing queue 903 fails (there is no sub-task in the low priority processing queue 903).

In a case where the first threshold value is increased in steps S612 and S613 in FIG. 7, the threshold values Mh, Ml, and Mn are also increased based on the increment. In this case, threads corresponding to the increment are additionally started in the respective thread groups. In a case where the first threshold value is decreased in step S615, the threshold values Mh, Ml, and Mn are also decreased based on the decrement.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-131059, filed Jul. 16, 2019, which is hereby incorporated by reference herein in its entirety.

What is claimed is:

1. An information processing apparatus comprising:
at least one memory storing instructions related to an agent application that executes processing according to a request from a manager; and
at least one processor executing the instructions to cause the information processing apparatus to:
manage a record of a response time relating to a communication including a transmission of data by the agent application and a response from the manager;
receive one or more requests from the manager;
execute processing according to the one or more requests from the manager, by using a plurality of threads, a number of the plurality of threads being a first threshold value or less;
transmit, to the manager, data indicating a result of the executed processing; and
perform an adjustment to decrease the first threshold value based on a change of an indicator value indicating a processing load on the manager, the indicator value being derived from records of a plurality of response times corresponding to a plurality instances of communications performed between the agent application and the manager.

2. The information processing apparatus according to claim 1, wherein, in a case where a total number of threads being executed exceeds the first threshold value, a thread which has been started for executing the processing by the agent application, according to the request from the manager, interrupts the processing and is discarded.

3. The information processing apparatus according to claim 1, wherein the instructions further cause the information processing apparatus to perform an adjustment to increase the first threshold value in a case where it is determined that a processing load on the manager is improved based on the change of the indicator value after the adjustment to decrease the first threshold value has been performed.

4. The information processing apparatus according to claim 3, wherein, in a case where the first threshold value is increased, a thread for executing the processing by the agent according to the request from the manager is additionally started.

5. The information processing apparatus according to claim 1,
wherein the data indicating the result of the executed processing is transmitted to the manager by a plurality of data transmission threads, a number of the plurality of data transmission threads being a second threshold value or less, and
wherein the instructions further cause the information processing apparatus to perform an adjustment to decrease the second threshold value based on the change of the indicator value indicating the processing load on the manager.

6. The information processing apparatus according to claim 5, wherein, in a case where a total number of the data transmission threads being executed exceeds the second threshold value, a data transmission thread interrupts the processing and is discarded.

7. The information processing apparatus according to claim 1, wherein the instructions further cause the information processing apparatus to:
calculate the response time in a case where a response from the manager is received after transmission of the data indicating the result of the executed processing to the manager; and
wherein a record of the response time is managed based on the calculation.

8. The information processing apparatus according to claim 1, wherein the processing according to the request from the manager includes at least any one of status monitoring, backup of a setting value, delivery of setting information, delivery of an address book, or delivery of software with respect to each of a plurality of devices as a management target of the manager.

9. A method executed in an information processing apparatus in which an agent application that executes processing according to a request from a manager operates, the method comprising:

managing a record of a response time relating to a communication including a transmission of data by the agent application and a response from the manager;
receiving one or more requests from the manager;
executing processing according to the one or more requests from the manager by using a plurality of threads, a number of the plurality of threads being a first threshold value or less;
transmitting, to the manager, data indicating a result of the executed processing; and
performing an adjustment to decrease the first threshold value based on a change of an indicator value indicating a processing load on the manager, the indicator value being derived from records of a plurality of response times corresponding to a plurality of instances of communications performed between the agent application and the manager.

10. A non-transitory computer-readable storage medium having computer executable instructions for a method stored thereon, wherein the instructions relates to an agent application that executes processing according to a request from a manager the method comprising:
managing a record of a response time relating to a communication including a transmission of data by the agent application and a response from the manager;
receiving one or more requests from the manager;
executing processing according to the one or more requests from the manager by using a plurality of threads, a number of the plurality of threads being a first threshold value or less;
transmitting, to the manager, data indicating a result of the executed processing; and
performing an adjustment to decrease the first threshold value based on a change of an indicator value indicating a processing load on the manager, the indicator value being derived from records of a plurality of response times corresponding to a plurality of instances of communications performed between the agent application and the manager.

\* \* \* \* \*